(12) United States Patent
Rigler (10) Patent No.: US 7,894,599 B2
(45) Date of Patent: Feb. 22, 2011

(54) ENHANCED DATA SECURITY WITH REDUNDANT INCLUSIVE DATA ENCRYPTION SEGMENTS

(75) Inventor: John A. Rigler, Grapevine, TX (US)

(73) Assignee: International Business Machines Corporation, Armonk, NY (US)

( * ) Notice: Subject to any disclaimer, the term of this patent is extended or adjusted under 35 U.S.C. 154(b) by 1114 days.

(21) Appl. No.: 11/566,483

(22) Filed: Dec. 4, 2006

(65) Prior Publication Data

US 2008/0130890 A1 Jun. 5, 2008

(51) Int. Cl.
*H04L 9/18* (2006.01)
(52) U.S. Cl. .............................. 380/28; 380/37; 380/59; 380/277
(58) Field of Classification Search .................. 380/28, 380/37, 59, 277
See application file for complete search history.

(56) References Cited

U.S. PATENT DOCUMENTS

| | | | |
|---|---|---|---|
| 5,265,164 | A | 11/1993 | Matyas et al. |
| 2002/0150239 | A1 * | 10/2002 | Carny et al. .................... 380/37 |
| 2003/0081790 | A1 * | 5/2003 | Kallahalla et al. ........... 380/281 |
| 2003/0185398 | A1 | 10/2003 | Hypponnen |
| 2005/0138374 | A1 | 6/2005 | Zheng et al. |
| 2006/0088167 | A1 | 4/2006 | Bade et al. |

FOREIGN PATENT DOCUMENTS

EP 1 130 528 A1 9/2001

(Continued)

OTHER PUBLICATIONS

Choi (Sung Jin Choi, Hee Young Youn, Bo Kyoung Lee, "An efficient dispersal and encryption scheme for secure distributed information storage", Lecture Notes in Computer Science Proceedings of the 2003 International Conference on Computational Science, pp. 958-967, ISBN 978-3-540-40197-1, ISSN:0302-9743, 3-540-40197-0).*

(Continued)

*Primary Examiner*—Kambiz Zand
*Assistant Examiner*—Peter Poltorak
(74) *Attorney, Agent, or Firm*—Ojanen Law Offices; Karuna Ojanen (57) ABSTRACT

A computerized method, program product, and a service to protect critical data by first splitting the data into N streams. A partitioning algorithm is applied to each stream to remove a portion of the data, the portion removed from one stream being included in another stream. Each stream is then encrypted with its own encryption key. Each encrypted stream plus at least two encryption keys not used to encrypt a particular encrypted stream are stored in a separate and unique memory location, such as a different server having its own security access procedures that are different from other servers and which may be located in different cities or countries. Retrieval of the data requires a program to know the memory locations of the data streams, and the inverse of the partitioning algorithm. Accessing one memory location may yield an encrypted stream and at least one encryption key for a different stream at a different memory location. By applying the inverse of the partitioning algorithm, the missing portions of each stream can be ascertained and the original data stream can be reconstructed.

20 Claims, 4 Drawing Sheets

FOREIGN PATENT DOCUMENTS

| | | |
|---|---|---|
| JP | 2001-103045 A | 4/2001 |
| WO | WO 00/74298 A1 | 12/2000 |

OTHER PUBLICATIONS

Wylie (Jay, J. Wylie, Michael W. Bigrigg, John D. Strunk, Gregory R. Ganger, Han Kiliccote, Pradeep K. Khosla, Survivable Infomration Storage Systems, IEEE, vol. 33, Issue 8, Aug. 2000, ISSN:0018-9162), p. 61-68.*

Yuan-Bo Guo et al., Secure and Distributed Conference-Key Distribution, IEEE Proc. 3rd Intl. Conf. on Machine Learning and Cybernetics, Aug. 26-29, 2004, pp. 2959-2962.

Yair Amir et al., Secure Group Communication Using Robeust Contributory Key Agreement, IEEE Trans. Parallel and Distributed Systems, vol. 15, No. 5, May 2004, pp. 468-480.

Yahya Y. Al-Salqan, Cryptographic Key Recovery, IEEE Proc. 6th Computer Soc. Workshop on Future Trends of Dist. Comp. Syss., Oct. 29-31, 1997, pp. 34-37.

* cited by examiner

ENHANCED DATA SECURITY WITH REDUNDANT INCLUSIVE DATA ENCRYPTION SEGMENTS

FIELD OF THE INVENTION

This invention relates to data encryption and more particularly relates to partitioning data into a number of different streams, assigning a unique encryption key to each stream, and then storing at least two encryption keys with a data stream on different servers.

BACKGROUND OF THE INVENTION

Increasingly so, protecting data on computers connected to the Internet or over any other digital network has become a mainstay industry in the field of digital communications. A critical aspect of security, moreover, is protecting data transferred over a network.

There are a number of commands and/or programs that permit a user on one computer to access data on a remote computer over a network, such as the Internet. One such command is a UNIX command, RLOGIN, that allows an authorized user to login to other UNIX computers having the RLOGIND service (or daemon) across a network. A user connected to a remote computer through this command can interact with the computer in the same way as if she/he were physically present. Another such program is remote shell (RSH) that allows a user to execute non-interactive programs on a remote system running a remote shell daemon (rshd) and returns the remote program's standard output and standard error output. Remote copy (RCP) allows a user to transfer multiple files and recursively copy entire directory trees files to and from another system running a remote shell daemon (rshd) that supports RCP over the network. An anonymous File Transfer Protocol (FTP) is a file transfer between locations that does not require users to identify themselves with a password or log-in. An anonymous FTP is not secure, because it can be accessed by any other user of the WWW. RCP is another command that does not require a user to log in or specify a password for the remote system. Yet another example of a program accessing other programs on remote computers is the RDist program that maintains identical copies of files on multiple hosts and, if possible, RDist preserves the owner, group, mode, and time of files and may further update programs that are executing.

Secure Shell (ssh) is a replacement program for RLOGIN, RSH, RCP, AND RDIST programs discussed above. SSH provides strong authentication and secure communications over insecure channels and allows one user to log into another computer over a network, execute commands in the remote machine, and move files from one machine to another. SSH, moreover, protects a network from attacks such as Internet Protocol (IP) spoofing, IP source routing, and Domain Name System (DNS) spoofing. An attacker who has managed to take over a network can only force SSH to disconnect and cannot play back the traffic or hijack the connection when encryption is enabled.

While SSH does a fine job protecting a connection, once the data reaches its destination generally it is no longer encrypted so that in the case of a shared backup server the data could be retrieved if the server were hacked into. The simple solution to this problem would be to encrypt the data before backing it up. But doing this then means that a user must maintain a key with which to decrypt the data in order to retrieve it. Losing a key might seem a trivial problem to solve; after all, SSH is widely used and keys are simply replaced if one is lost. When dealing with a file which has been locked with an encrypted key, however, the problem is much different because an administrator can't access a data file as she/he might log into or otherwise access a system to replace the key. Thus, if a user loses the key with the original system or makes a backup of it to a workstation, or even electronically mails it to her/himself, the key can easily get lost. So, the irony is that data loss can occur when trying for greater data protection; all the data which was so carefully archived and encrypted might become worthless because without the key, there is no backup way to decrypt the data.

There are several techniques that use passwords and special questions to recover the key or a special key recovery file but the integrity of the system can still be compromised if the key recovery file is found and a password is known. On the other hand, a user can still suffer from a massive data loss if the password or passphrase information for the Certification Authority (CA) key recovery file is also lost. The problem with any password or passphrase tied to an encrypted file is that the password or passphrase must be remembered. Finally, sometimes encryption keys are separated and distributed on different nodes with a certain level of redundancy. There is still a need, however, to provide a method and a machine to store split data securely across a network of servers.

These needs and other that will become apparent are solved by the invention as stated below:

SUMMARY OF THE INVENTION

The enhanced data security having redundant inclusive data encryption (RIDES) solves the key problem by a program, a method, a service, and a machine that will take an original data file, copy and/or split the data file into a number of data streams. Then the enhanced data security having redundant inclusive data encryption will treat each data stream differently using the same or different partitioning algorithm(s) to, e.g., remove different characters or fields from each stream. The enhanced data security having redundant inclusive data encryption procedures and machine herein then assign a different encryption key to each stream. Once each data stream has been encrypted, it is then archived to a different memory location, such as a different server in a different city, and is stored with encryption keys to at two other data streams.

The enhanced security program, method, machine, and service disclosed also retrieves the data streams and reconstructs the original data file. All that is needed is the enhanced data security having redundant inclusive data encryption, the memory locations of the data streams, and the inverse(s) of the partitioning algorithm(s). The enhanced data security program and machine herein will read one or more memory locations, retrieve the encrypted data stream from each memory location onto a secure server and retrieve the encryption keys to at least two other data streams at other memory locations. The enhanced data security having redundant inclusive data encryption program will then retrieve at least two other data streams from the other memory locations onto the secure server, and so on until all the data streams and their keys have been retrieved. Teach data stream is deciphered using its respective encryption key. Then applying the inverse(s) of the partitioning algorithm(s) to the deciphered streams, the original data stream can be reconstructed in its entirety.

DETAILED DESCRIPTION OF THE INVENTION

The invention is described with reference to the accompanying drawings; however, the invention may be embodied in many different forms and should not be construed as limited to the embodiments set forth herein. Rather the illustrated embodiments are provided so that this disclosure is thorough and complete, and fully conveys the scope of the invention to those skilled in the art. Like numbers refer to like elements throughout.

As will be appreciated by one of skill in the art, the present invention may be embodied as a method, a data processing system, a computer program product and a service to partition, encrypt, and store data to provide enhanced security. Accordingly, the present invention may take the form of an entirely hardware embodiment, an entirely software embodiment, or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program source code of the enhanced security program with redundant inclusive data encryption to divide, encrypt, decrypt, and generate keys in accordance with a preferred mode described herein may be written in an object oriented programming language such as C, COBOL, FORTRAN, LISP, JAVA, SMALLTALK or C++. Object code of the enhanced security program with RIDES may execute entirely on an original secure computer, partly on the original or secure backup computer, as a stand-alone software package, partly on the original or backup computer and partly on a secure remote computer or entirely on the remote computer. In the latter scenario, the secure remote computer may be connected to the secure original or secure backup computer through a local area network (LAN) or a wide area network (WAN), or the connection may be made to an external computer via the Internet using an Internet Service Provider.

The enhanced security program with redundant inclusive data encryption is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions for the enhanced security program with redundant inclusive data encryption may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks. The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
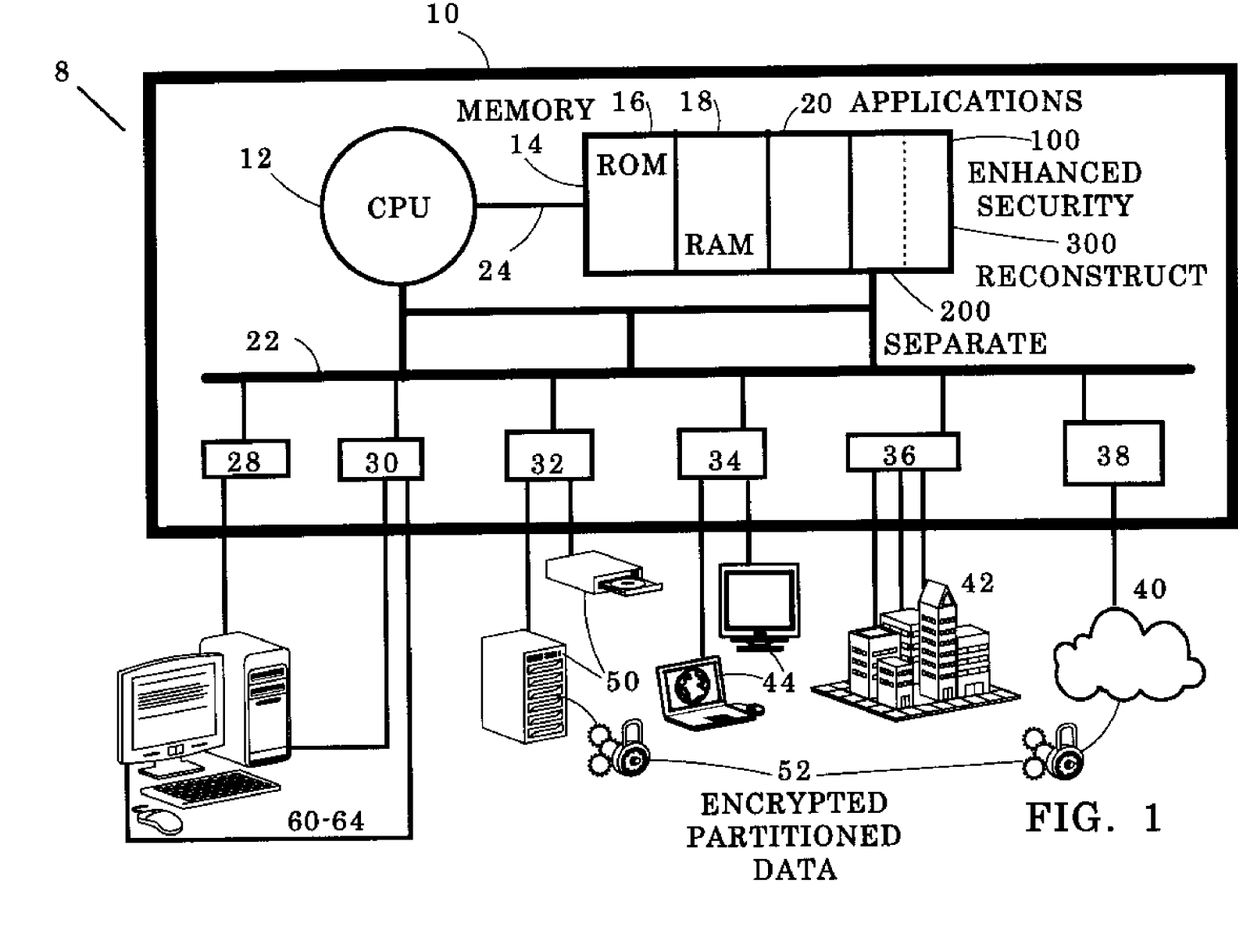
FIG. 1 is a simplified block diagram of a data processing network and machine having the enhanced security program in accordance with an embodiment of the invention.

Referring to FIG. 1, a high-level block diagram of a computer network system 8 consistent with an embodiment of the invention is shown. Computer network system 8 preferably comprises a number of secure networked computers 10, each of which may have a central processing unit (CPU) 12, memory 14, and various digital and/or analog interfaces 28-38. The various devices communicate with each other via an internal communications bus 22. CPU 12 is a general-purpose programmable processor, executing instructions stored in memory 14; while a single CPU is shown in FIG. 1, it should be understood that computer systems having multiple CPUs could be used. CPU 12 is capable of executing an operating system 20 and the enhanced security program with redundant inclusive data encryption segments 100 and other applications. CPU 12 is also capable of generating the computer program or the instructions embodying the enhanced security program with redundant inclusive data encryption segments 100 and is capable of receiving and transmitting the program instructions embodying the enhanced security program with redundant inclusive data encryption segments 100, and is capable of storing the original data, the encrypted data and keys generated by the enhanced security program with redundant inclusive data encryption segments 100 described herein. Communications bus 22 supports transfer of data, commands and other information between different devices, and while shown in simplified form as a single bus, it is typically structured as multiple buses including an internal bus 24 which may connect the CPU 12 directly with memory 14.

Memory 14 comprises a read only memory (ROM) 16 and a random-access memory (RAM) 18 for storing the operating system 20, the enhanced security program with redundant inclusive data encryption segments 100, and other data and programs. Typically, those portions or programs, routines, modules of the operating system 20 necessary to "boot up" are stored in ROM 16. RAM 18 typically stores programs and data that will be erased when the computer turns off. Memory 14 is shown conceptually as a single monolithic entity but it is well known that memory is often arranged in a hierarchy of caches and other memory devices, some or all of which may be integrated into the same semiconductor substrate as the CPU 12. RAM 18 devices comprises the main storage of computer, as well as any supplemental levels of memory, e.g., cache memories, nonvolatile or backup memories, programmable or flash memories, other read-only memories, etc. In addition, memory 14 may be considered to include memory storage physically located elsewhere in computer, e.g., a cache memory in a processor or other storage capacity used as a virtual memory, e.g., as stored on a mass storage device 50 or on another computer coupled to computer via network.

Operating system 20 and the enhanced security program with redundant inclusive data encryption segments 100 and other applications reside in memory 14. Operating system 20 provides, inter alia, functions such as device interfaces, management of memory pages, management of multiple tasks, etc. as is known in the art. Examples of such operating systems may include LINUX, AIX, UNIX, Windows-based, Z/OS, V/OS, OS/400, an RTOS, a handheld operating system, etc. These operating systems 20 and other various routines of the enhanced security program with redundant inclusive data encryption segments 100, and other applications, components, programs, objects, modules, etc. may also execute on one or more processors in another computer coupled to computer 10 via a network 40, 42, e.g., in a distributed or client-server computing environment, whereby the processing required to implement the functions of a computer program may be allocated to multiple computers 10 over a network 40, 42. Moreover, it is presumed that a preferred embodiment of the invention requires that separate portions of the encrypted data and at least two different keys for the portions of the data be allocated to multiple computers 10 over a network 40, 42.

In general, the enhanced security program with redundant inclusive data encryption segments 100 executes within the CPU 12 to implement the embodiments of the invention, whether implemented as part of an operating system or a specific application, component, program, object, module or sequence of instructions may be referred to herein as computer programs or simply programs. The enhanced security program with redundant inclusive data encryption segments 100 typically comprise one or more instructions that are resident at various times in various memory and storage in a device and that, when read and executed by one or more processors in the processing device 10, cause that device 10 to perform the steps necessary to execute steps or elements embodying the various aspects of the invention. The enhanced security program with redundant inclusive data encryption segments 100 comprises a separation module or routine 200 that will obtain the original data, partition the data, assign keys, encrypt the data and store the streams at separate memory locations. The enhanced security program with redundant inclusive data encryption segments 100 further comprises a reconstruct module or routine 300 that will read memory locations and retrieve the various streams from the various memory locations and reconstruct the data through deciphering and reconstruction.

It should be appreciated that computer 10 typically includes suitable analog and/or digital interfaces 28-38 between CPU 12 and the attached components as is known in the art. For instance, computer 10 typically receives a number of inputs and outputs for communicating information externally. For interface with a software developer or operator, computer 10 typically includes one or more software developer input devices 60-64, e.g., a keyboard, a mouse, a trackball, a joystick, a touchpad, and/or a microphone, among others, and a display such as a CRT monitor, an LCD display panel, and/or a speaker, among others. It should be appreciated, however, that some implementations of computer 10, e.g., some server implementations, might not support direct software developer input and output. Terminal interface 34 may support the attachment of single or multiple terminals 44 and may be implemented as one or multiple electronic circuit cards or other units. Data storage 50 preferably comprises one or more rotating magnetic hard disk drive units, although other types of data storage, including a tape or optical driver, could be used. For additional storage, computer 10 may also include one or more mass storage devices 50, e.g., a floppy or other removable disk drive, a hard disk drive, a direct access storage device (DASD), an optical drive e.g., a compact disk (CD) drive, a digital video disk (DVD) drive, etc., and/or a tape drive, among others. An encrypted data stream having only a portion of the data 52 created by the enhanced security program with redundant inclusive data encryption segments 100 may be stored on these mass storage devices of different computers 10 that are located through the internet 40, a WAN 42, and other connected machines 42. One of skill in the art will further anticipate that the interfaces 28-38 may also be wireless.

Furthermore, computer 10 may include an interface 36, 38 with one or more networks 40, 42 to permit the communication of information with other computers 10 coupled to the network(s) 40, 42. Network interface(s) 36, 38 provides a physical and/or wireless connection for transmission of data to and from a network(s) 40, 42. Network(s) 40, 42 may be the Internet, as well as any smaller self-contained network such as an Intranet, a wide adrea network (WAN), a local area network (LAN), or other internal or external network using, e.g., telephone transmissions lines, satellites, fiber optics, T1 lines, wireless, public cable, etc. and any various available technologies. One of ordinary skill in the art understands that computer system 8 may be connected to more than one network 40, 42 simultaneously. Computer system and remote systems 8 may be desktop or personal computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may also be networked through network(s) 40, 42. Still yet, any of the components of the method and program products shown in the embodiments of FIG. 1 through FIG. 4 could be deployed, managed, serviced by a service provider who offers to perform one or more of: the separation routine 200, the reconstruct module 300 or other process steps that the enhanced security program with redundant inclusive data encryption segments 100 can perform, e.g., receive data, encrypt the data, partition the data, generate the appropriate encryption keys, store the data, retrieve the data, and/or reconstruct the data In a general perspective, the enhanced security program with redundant inclusive data encryption segments 100 is preferably installed and executes on a secure computer. The enhanced data security having redundant inclusive data encryption receives and copies and/or divides the data into a plurality of N streams: stream 1, stream 2, stream 3 . . . stream N. The enhanced security program with redundant inclusive data encryption segments 100 program then calls the separation module or routine 200 that applies a partitioning algorithm that removes unique data from each stream. The separation routine 200 then encrypts each stream with is own unique encryption key. The enhanced security program with redundant inclusive data encryption segments 100 program then archives each partitioned and encrypted data stream to its own unique memory location, preferably a unique and secure server, different from the original computer, and different from another server upon which another stream is stored, i.e., file or stream 1 will be archived to memory location 1 (preferably secure server 1), file or stream 2 will be archived to memory location 2, and file or stream 3 will be archived to memory location 3 . . . file or stream N will be archived to memory location N, preferably on secure server N. In the context herein, a memory location is preferably a nonvolatile or backup memories or a programmable or flash memories, read-only memories, etc., in a device physically located on a different computer, client, server, or other hardware memory device, such as a mass storage device or on another computer coupled to computer via network. Memory location preferably comprises remote archival memory such as one or more rotating magnetic hard disk drive units, a tape or optical driver. Memory location may also be considered one or more mass storage devices, such as a floppy or other removable disk drive, a hard disk drive, a direct access storage device (DASD), an optical drive e.g., a compact disk (CD) drive, a digital video disk (DVD) drive, etc., and/or a tape drive, among others.

Figure 2:
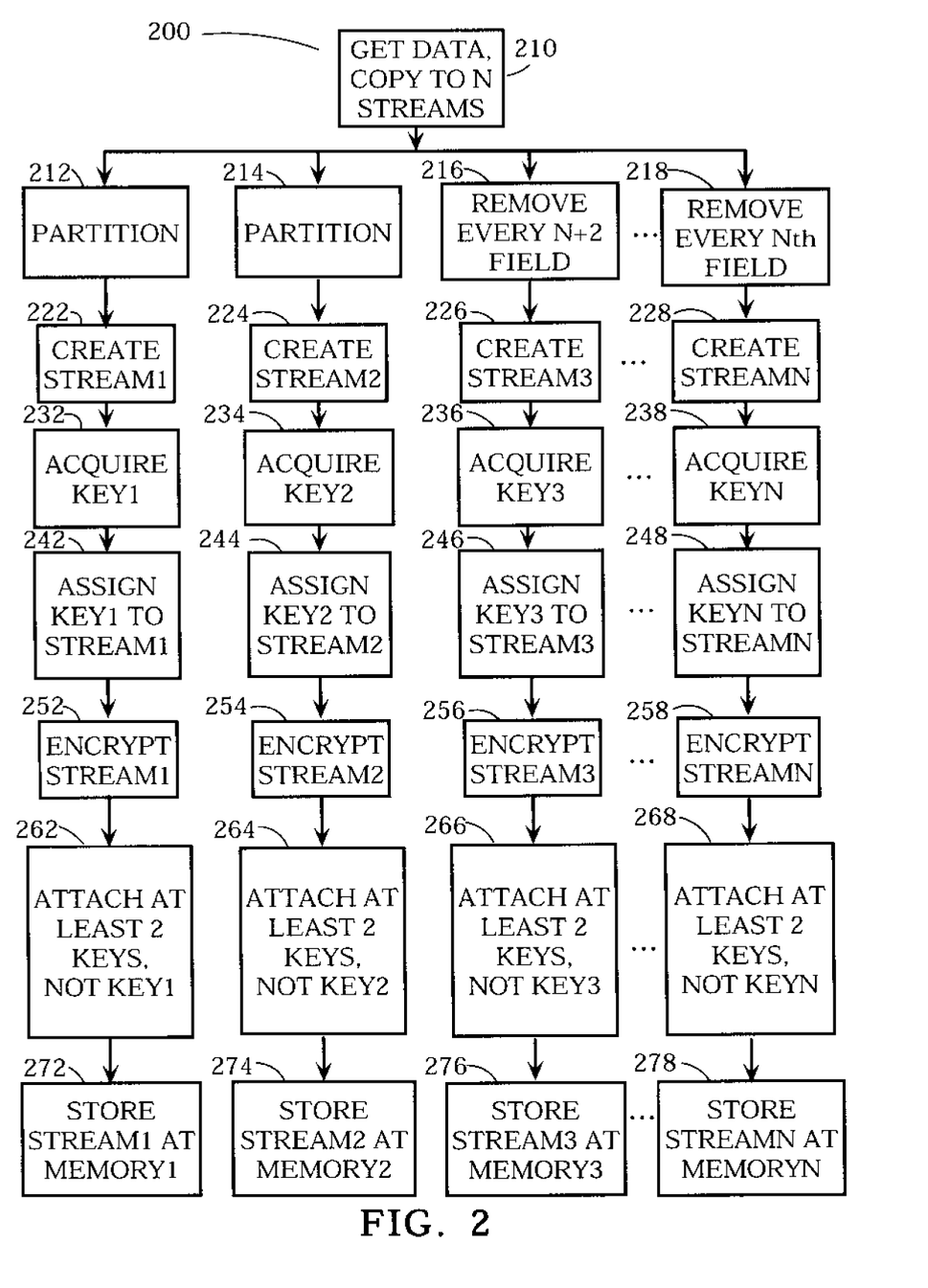
FIG. 2 is a simplified flow chart of how the enhanced security program may partition, encrypted, and store data at different memory locations in accordance with an embodiment of the invention.

With respect to FIG. 2, a more detailed flow chart of the process steps of the separation routine 200 of the enhanced security program with redundant inclusive data encryption segments 100 by which a program, a service, a method, and a machine may provide enhanced security in accordance with the invention, is presented. In step 210, the enhanced security program with redundant inclusive data encryption segments 100 transfers the data to be secured onto a secure computer or server or client and calls the separation module 200. Once the data is secured, then in step 210, the separation module 200 copies and/or splits the data into N different data streams or files. In steps 212 through 218, the separation module 200 will call a partitioning algorithm to partition the data in each stream. One such example of a partitioning algorithm is given in steps 216 and steps 218 wherein the program removes a different character or field from each partitioned file or stream. By way of example only, the program may call a partitioning algorithm that removes the first character or field out of a predetermined number or N characters or fields from one stream as in step 212; removes the second character or field out of a predetermined number of characters or fields to create Stream 2 in step 224. For N number of streams, the program removes the Nth character or field from the predetermined number of characters or fields to create the Nth stream in step 228. Note that this is a relatively simple character or field removal algorithm; one of skill in the art will understand that the principle is that the separation module 200 calls a partitioning algorithm to create a number of unique streams having different characters or fields removed and that those removed characters or fields remain intact in the other streams. Certainly, there are other partitioning algorithms for removing one or more characters or fields from the partitions; for example, from Stream 1 every N+5th character could be removed. In yet another embodiment, more than one character for every N characters could be removed from each stream. For example, if N=14, such that there are fourteen streams, then the first stream might have every $7^{th}$ and every $14^{th}$ character removed; or every $1^{st}$ and every $9^{th}$ character removed, etc. In yet another embodiment, the separation module 200 may apply a different partitioning algorithm to each or several streams. In any event, the partitioning algorithm and its inverse algorithm that is applied to the partitioned data to recreate the original stream must be preserved, preferably in a different memory location than any of the partitioned streams, and may be stored with the enhanced security program with redundant inclusive data encryption segments 100 program itself.

In an embodiment of three streams created from the original file, each stream may alternatively drop every third character according to this formula: FileNum!=Location % N, or, in simpler terms, for N=3:

| Stream Number: | Character 0 | Character 1 | Character 2 |
|---|---|---|---|
| 0 | include | include | exclude |
| 1 | include | exclude | include |
| 2 | exclude | include | include |

Then in steps 222, 224, 226, and 228, each unique stream is created wherein unique characters or fields are removed from each respective stream but are intact in the other streams. In steps 232, 234, 236, and 238, the separation routine 200 acquires a plurality, preferably the same number N as the number of data streams, encryption keys such as RSA for (Rivest, Shamir, Adleman), the Data Encryption Standard (DES), the Advanced Encryption Standard (AES), the Digital Signature Algorithm (DSA) or other public or private encryption, or symmetric keys. In steps 242, 244, 246, and 248, the separation routine 200 assigns an encryption key N to partitioned Stream N such that encryption key N is necessary to access, decode and understand Stream N. In the preferred embodiment, a different encryption key is assigned to each partitioned stream, however, there are alternative embodiments wherein one encryption key may be assigned to more than one partitioned data stream, in which case, it would be preferred that the two or more data streams having the same encryption key not be stored in the same memory location. A critical feature of the invention, however, is that the enhanced security program with redundant inclusive data encryption segments 100 does not store the encryption key N for the data streams with those data streams; rather encryption key N is stored with at least two other partitioned data streams requiring a different encryption key.

In steps 252, 254, 256, and 258, the separation module 200 calls an encryption algorithm to encrypt each data stream and assigns its respective encryption key. In steps 262, 264, 266, 268, the separation module 200 then writes an encryption key to at least two encrypted streams other than the stream(s) that the encryption key decodes. In the instance of three streams of data: the separation module 200 writes keys 2 and 3 to Stream 1, writes keys 1 and 3 to Stream 2, writes keys 1 and 2 to Stream 3.

In steps 272, 274, 276, and 278, the enhanced security program with redundant inclusive data encryption segments 100 program then writes each partitioned and encrypted data stream, along with encryption keys to decode other streams, to different memory locations. Preferably, these memory locations will be located on remote secure servers in different physical locations, each server having a different security procedure with which to access data on the server. Examples of security procedures may be different passwords or passphrases per computer, or even different access keys or other identifications.

By way of example only, the separation module 200 copies and/or splits the original data into three data streams and removes one character or field from each data stream. The result is that each data stream has ⅔ or 66 percent of original file with the following characteristics: encrypted stream 1 has a first of a predetermined number of characters or fields removed, stores key 2 for stream 2 and key 3 for stream 3, and is stored on server 1, e.g., in Texas; encrypted stream 2 having every second of the predetermined number of characters or fields removed, stores key 1 for stream 1 and key 3 for stream 3, and is stored on server 2, e.g., in Colorado; encrypted stream 3 has every third of the predetermined characters or fields removed, stores key 1 for stream 1 and key 2 for stream 2, and is stored on server 3, e.g., in Arizona.

Figure 3:
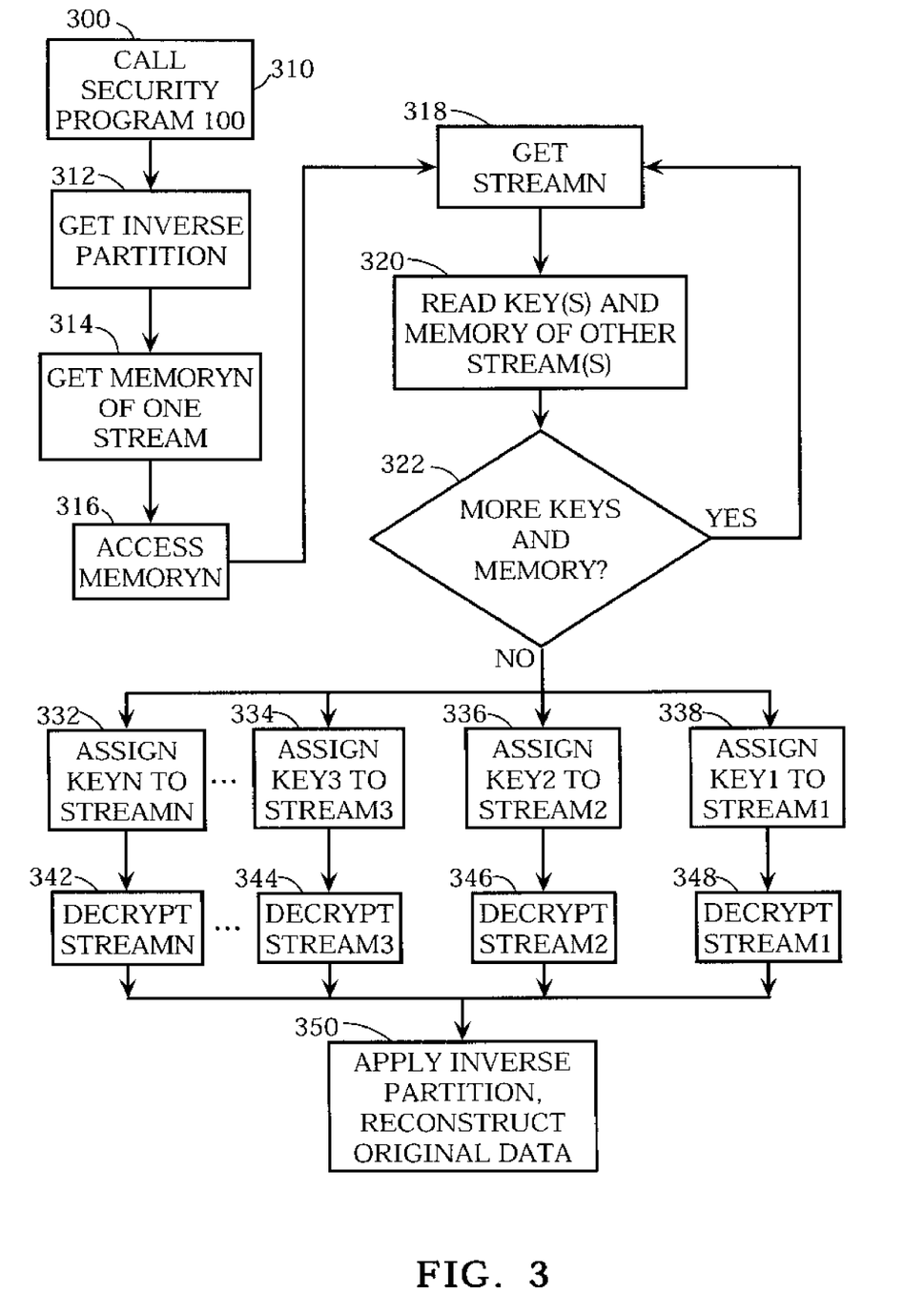
FIG. 3 is a simplified flow chart of how the enhanced security program may retrieve the different data streams from their respective memory locations, and decrypt and reconstruct the original data in accordance with an embodiment of the invention.

Thus, in the case of three data streams, any two streams are all that are necessary to regenerate the entire original pattern and each stream would have two keys allowing decryption of at least two alternate streams. With reference to FIG. 3, a flow chart of the reconstruct module 300 of the enhanced security program with redundant inclusive data encryption segments 100 to reconstruct the encrypted and partitioned data is presented. In step 310, a user or an application program interface of an application requiring the data calls the enhanced security program with redundant inclusive data encryption segments 100 program which in turns calls the reconstruct routine 300. The reconstruct routine 300 may at this point or later, call the inverse partitioning algorithm(s) in step 312. Recall that in FIG. 2, steps 212 through 218 the data was partitioned and as an example of a partitioning algorithm, every nth character or field was removed from the nth stream. The reconstruct module 300 calls the inverse of the partitioning algorithm(s) so that it may reconstruct the original data stream. The partitioning algorithm and/or its inverse may be stored with the enhanced security program with redundant inclusive data encryption segments 100 program and/or may be stored separately from it. For added security, however, the partitioning algorithm(s) and its inverse algorithm(s) should be stored at different memory locations, such as on different servers, from the enhanced security program with redundant inclusive data encryption segments 100 program and from each other. In step 314, the reconstruct routine 300 calls for the memory location of at least one stream, the location of which may be stored with the enhanced security program with redundant inclusive data encryption segments 100 program or may be remotely stored on the same or other memory location as the partitioning algorithm(s) of the separation routine 200. One may consider storing two memory locations with either the separation module 200, the partitioning algorithm(s), the enhanced security program with redundant inclusive data encryption segments 100, or the reconstruction module 300 just in case one of the memory locations has been compromised. In this way, each encrypted partitioned data stream may still be retrievable. In an alternative embodiment, the reconstruct module 300 may acquire the memory locations of all the partitioned streams; or yet, another alternative embodiment is the memory location of a data stream may be stored with the encryption key(s) to that data stream. In step 316, the reconstruct module 300 then accesses the memory location n, which as previously mentioned may be a distinct secure Server N and proceeds through the security procedures of Server N, which preferably are different than the security procedures of the other secure servers. In step 318, the reconstruct module 300 then retrieves Stream n from its memory location onto its own secure server, preferably other than Server n or any of the other servers having encrypted and partitioned data streams. In step 320, the reconstruct module 300 reads the encryption keys and perhaps the memory locations for at least two other streams that are stored with stream n. Note that at this time, the reconstruct module 300 may not be able to decrypt data stream n because it may not yet have acquired the encryption key associated with stream n. In step 322, the reconstruct module 300 checks if there are more keys and memory locations to access. If there are more streams and more keys, then using the keys and memory locations just acquired, the reconstruct module 300 proceeds through the security procedures for each memory location and retrieves the data streams from those memory locations as in step 318. The reconstruct module 300 reads any additional keys and memory locations as in step 320. Recall, in the alternative embodiment, the key and the memory location of the same stream may not necessarily be stored together. When all the data streams have been acquired from each respective memory location or server, the reconstruct module 300 then reassigns an encryption key to its respective data stream, as in steps 332, 334, 336, and 338. In steps 342, 344, 346, and 348, the reconstruct module deciphers each partitioned data stream using the respective encryption keys.

Then in step 350, the reconstruct module 300 applies the inverse(s) of the partitioning algorithm(s) to reconstruct the original data stream on its own or another secure server. With respect to the example of the partitioning algorithm given above, the reconstruct module 300 may read the third character from stream 1 and insert it into the third position of stream 3, then read the first character from stream 2 and insert it as the first character of stream 1, and in a general methodology, may read every nth character from stream n+1 and insert every nth character into every nth position of the nth stream. The reconstruct module 300 then reconstructs the data using the inverse partitioning algorithm(s) in step 350.

Figure 4:
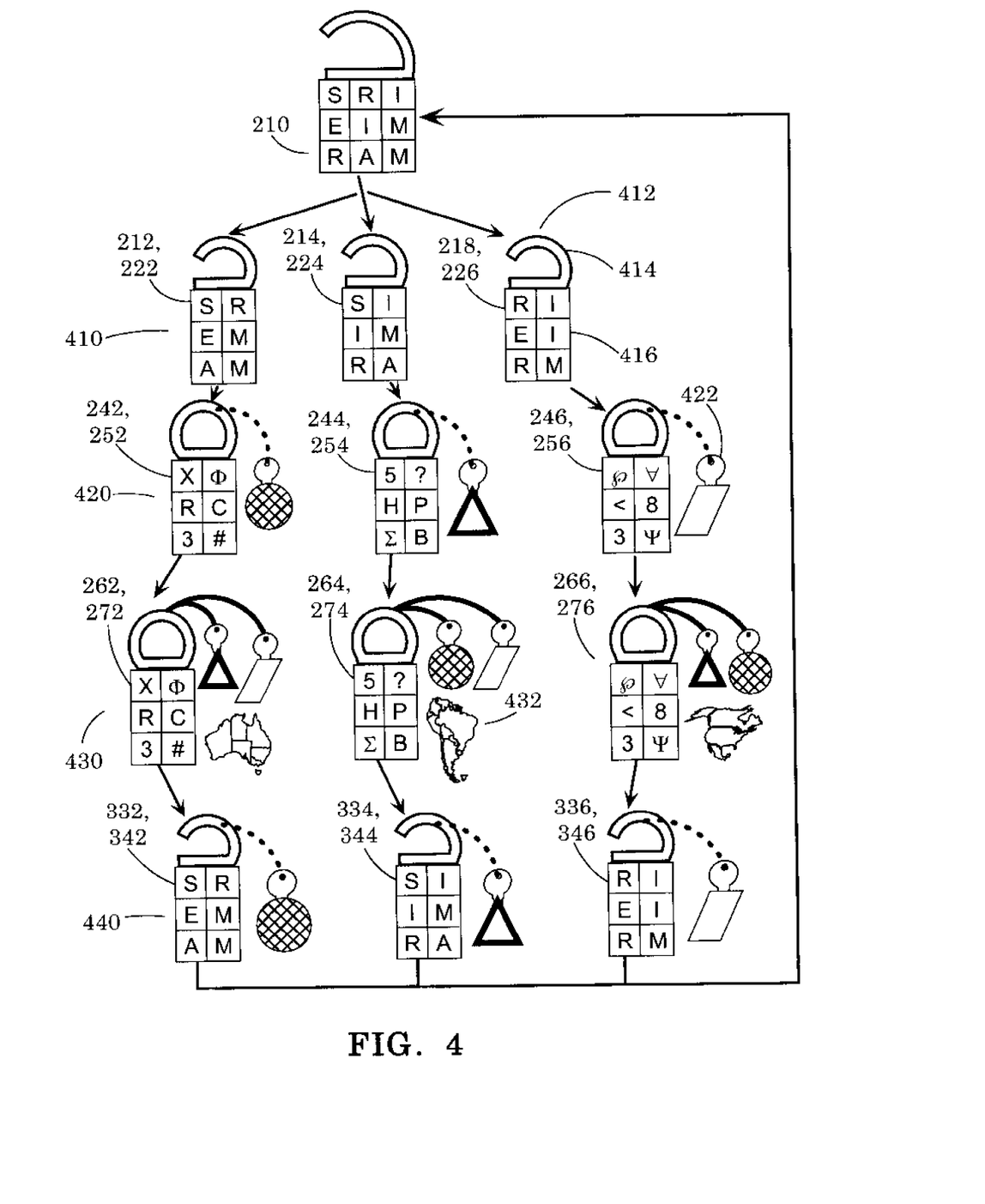
FIG. 4 is a graphical representation of steps of the enhanced security program in accordance with an embodiment of the invention. It is suggested that FIG. 4 be printed on the face of the patent.

FIG. 4 provides a graphical illustration of the steps of the enhanced security program with redundant inclusive data encryption segments 100. FIG. 4 has five rows labelled 210, 410, 420, 430 and 440. Rows 410, 420, 430 and 440 each have three data streams 412. A data stream 412 is illustrated as having a padlock 414 and a table of letters/symbols 416 underneath each padlock 414. In the first row 210, the enhanced security program with redundant inclusive data encryption segments 100 first acquires the data and the separation module 200 splits the data into N streams, shown as step 210 in FIG. 2. In the second row 410 of FIG. 4, the data does not yet have the enhanced security features provided by the invention but the separation routine 200 performs steps 212 through 218 and may make three copies of the original data or divide the original data into three streams. The separation routine 200 then partitions the data in steps 222 through 228 which can be seen by the blacked-out or redacted blocks of the table of letters/symbols in each data stream of the second row 410. Note that the separation routine 200 called a different partitioning algorithm for each data stream, as shown by there not being a repetitive patterns of redacted characters or fields in the data streams shown. Row 420 of FIG. 4 shows that the separation routine 200 assigns a different cryptographic key 422 to each data stream as in steps 242 through 246 of FIG. 2 and encrypts the data in each stream as in steps 252 through 256 of FIG. 2. Thus, partial secure features of the enhanced security program with redundant inclusive data encryption segments 100 have been implemented. Note that the tables of characters/fields 416 in the third row 420 of FIG. 4 are encrypted and have changed from the second row of FIG. 4.

In the fourth row 430 of FIG. 4, the enhanced security program with redundant inclusive data encryption segments 100 executes steps 262 through 266 and steps 272 through 276 of the separation module 200 and stores at least two different encryption keys 422, other than the key that deciphers the stream, on different computers 432, preferably at different physical locations. Thus, the original data stream now is fully protected with the features of the enhanced security program with redundant inclusive data encryption segments 100.

Finally, in the fifth row 440 of FIG. 4, the reconstruct module 300 has retrieved the data and assigned the cryptographic key 422 to its respective data stream and has deciphered each stream. The data in row 440 has not yet been reconstructed. Then, the reconstruction routine 300 applies the inverse(s) of the partitioning algorithm(s) to reconstruct the original intact data as in row 210.

Thus, the enhanced security program with redundant inclusive data encryption segments 100 provides a number of advantages by partitioning the data into a number of streams, removing different characters or fields from each stream, encrypting the stream, and then archiving the encrypted data stream with a number of encryption keys for other data streams. The actual backup space saved for each file more than compensates for the size of the keys integrated into each file, but still yields redundancy as well as an added level of security. For example, in the case of three data streams, a traditional redundant backup of 1024 Megabytes: 2048 Megabytes (1024M×2) would be required. For a RIDES backup of 1024 Megabytes there would be 1024×⅔=(675 Megabytes plus two key headers)*3=2025 Megabytes.

Extra benefits are realized. By storing of encrypted data on different systems operated by different people, rather than embedding a single password into a file, an entirely different location's normal security procedures protects not only its own data stream which cannot be read without one of the other segments, but also the other data streams whose keys are stored on the server. The solution described herein is not dependent upon the specific encryption algorithm applied to the data or upon specific calculations used to generate a key. The encryption and recovery system disclosed herein are beneath any level of traditional encryption and in fact hinders a hacker by requiring her/him to break into multiple remote systems before gaining access to the data, rather than regenerating a key.

Partitioning the data into a number of streams and coupling alternate keys with each stream further protects the data because an entire backup server can be irretrievably lost but the keys for each data stream could still be regenerated from other streams on other servers. The inventive solution herein, moreover, does not have to rely on password or passphrases at all except to gain access to the remote systems, which can be managed as traditional system logon with resettable passwords, etc.

Note that the data is partitioned rather than partitioning the encryption key. A number of distinct keys are stored with complementary encrypted data blocks on isolated servers. The data is partitioned, moreover, so that any two of the N streams of data can be decrypted to decrypt others to form the whole original data file. Each data stream would coincidentally then also have proper keys available for decryption of other data streams or the ability to access other data streams that would in turn have keys for other data streams. One of skill in art will further note that the system of encryption described herein is above and beyond standard levels of encryption used to communicate between servers, such as RSA or DSA and could even be used in conjunction with other solutions such as breaking up encryption keys. The system described herein, moreover, protects against lost keys because each key is stored with different data streams on different servers. Keys can simply be regenerated and applied to future connections. The solution herein keeps the data safe while at the same time doesn't require a password or passphrase, which are easily forgotten or lost.

It will be appreciated that variations of some elements are possible to adapt the invention for specific conditions or functions. In an alternative embodiment, the program can transmit the entire stream over the network, and a Tivoli API could be written to do this entire process without having to ever write a local file. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A method to protect an original data file, the method comprising the steps of:
    a computer copying the original data file into N different streams;
    for each of the N streams, the computer removing a portion of the data from each data stream according to a partitioning algorithm;
    the computer acquiring N different encryption keys;
    the computer assigning an Nth encryption key to at least one stream;
    the computer encrypting each data stream;
    the computer attaching at least two encryption keys, other than the Nth encryption key, with the Nth stream;
    the computer storing the at least two encryption keys other than the Nth encryption key and the Nth stream on a Nth memory location.

2. The method of claim 1, further comprising the computer storing at least one memory location, other than the Nth memory location, with the Nth stream on a Nth memory location.

3. The method of claim 1, wherein a partitioning algorithm executing in the computer removes the nth character or field from N characters or fields from the Nth stream.

4. The method of claim 1, wherein the encryption keys are symmetric encryption keys.

5. The method of claim 1, wherein the encryption keys are public keys.

6. The method of claim 5, wherein the public keys are RSA keys.

7. The method of claim 1, wherein a memory location refers to a unique computer server.

8. The method of claim 7, wherein the unique computer server has a security access procedure that is different from a security access procedure on another unique computer server.

9. The method of claim 8, wherein each unique computer server is in a different geographic location.

10. The method of claim 1, further comprising:
    the same or different computer reading the Nth memory location of at least one Nth stream;
    the same or different computer accessing the Nth stream on the Nth memory location;
    the same or different computer transferring the Nth stream to a secure server;
    the same or different computer reading at least one encryption key for a stream other than the Nth stream but having the at least one encryption key being stored with the Nth stream;
    the same or different computer reading the memory location of the stream other than the Nth stream but having its encryption key stored with the Nth stream;
    the same or different computer accessing the memory location of the stream other than the Nth stream but having its encryption key stored with the Nth stream;
    the same or different computer transmitting the stream other than the Nth stream onto the secure server; and the same or different computer decrypting the stream other than the Nth stream.

11. The method of claim 10, further comprising the same or different computer applying an inverse partitioning algorithm to the Nth stream.

12. The method of claim 11, further comprising the same or different computer combining at least two of the Nth streams to reconstruct the original data file.

13. A computer program product for enhancing data security with redundant inclusive data encryption segments, the computer program product comprising:
   a computer readable tangible storage device;
   first program instructions to copy an original data file into a plurality of data streams;
   second program instructions to remove a unique portion of the data file from each respective one of the plurality of data streams;
   third program instructions to obtain a plurality of data encryption keys;
   fourth program instructions to assign one of the plurality of data encryption key to a respective one of the plurality of data streams;
   fifth program instructions to encrypt each of the plurality of data streams sixth program instructions to attach at least two of the plurality of data encryption keys to each of the plurality of data streams, the at least two encryption keys not being assigned to the data stream to which it is attached;
   seventh program instructions to store each of the data streams and the attached at least two encryption keys in a memory location distinct from a memory location having any other data stream and the attached encryption keys: and
   wherein the first, second, third, fourth, fifth, sixth and seventh program instructions are stored on the computer readable tangible storage device.

14. The computer program product of claim 13, further comprising eighth program instructions to record the memory locations of all of the data streams and their attached keys wherein the eighth program instructions are stored on the computer readable tangible storage device.

15. The computer program product of claim 13 further comprising ninth program instructions to store each respective data stream and the attached cryptographic keys on a different computer having a different security access procedure from any other computer having one of the plurality of data streams with its respective attached cryptographic keys wherein the ninth program instructions are stored on the computer readable tangible storage device.

16. A computer program product for enhancing data security using redundant inclusive data encryption segments comprising:
   a computer readable tangible storage device;
   first program instructions to read at least one memory location of a first encrypted data stream, the first encrypted data stream having data fields missing that are contained in a plurality of other encrypted data streams, the first encrypted data stream also having at least two encryption keys attached, the at least two encryption keys to decipher others of the plurality of other encrypted data streams;
   second program instructions to read at least one algorithm used to remove data fields missing from each of the encrypted data streams having data missing;
   third program instructions to read a memory location of at least one of the plurality of other encrypted data streams that one of the two encryption keys attached to the first encrypted data stream will decipher;
   fourth program instructions to decipher the one of the plurality of other encrypted data streams using that one of the two encryption keys attached to the first encrypted data stream;
   fifth program instructions to obtain more encryption keys attached to others of the plurality of other encrypted data streams;
   sixth program instructions to decipher others of the plurality of other encrypted data streams;
   seventh program instructions to apply an inverse of the at least one algorithm to a minimum number of the plurality of encrypted data streams and reconstruct the data having no missing data fields
   wherein the first, second, third, fourth, fifth, sixth and seventh program instructions are stored on the computer readable tangible storage device.

17. A secure data communication system, comprising:
   a computer processor, a computer readable memory, and a computer readable storage media;
   a first transmitting data processing device which performs data transmission via a communication network, the first transmitting data processing device comprising program instructions for a separation routine, the separation routine further comprising:
   first program instructions to copy original data N times to create N data streams;
   second program instructions having a partitioning algorithm that uniquely partitions each of the N data streams so that fields removed from one of the N data streams are contained in another of the N data streams;
   third program instructions to encrypt each of the partitioned N data streams with a respective encryption key;
   fourth program instructions to attach at least two keys to each of the partitioned N data streams, the at least two keys attached to a partitioned data stream that the assigned keys cannot decipher;
   the computer readable memory storing a plurality of memory locations; wherein the transmitting data processing device transmits each of the partitioned N data streams and the at least two attached encryption keys to a separate one of the plurality of memory locations across the communication network
   wherein the first, second, third and fourth program instructions are stored on the computer readable storage media for execution by the computer processor via the computer readable memory.

18. The secure data communication system of claim 17, further comprising:
   a second computer processor, a second computer readable memory, and a second computer readable storage media;
   a secure receiving data processing device which receives data transmitted from at least one other secure transmitting data processing device via the communication network, said receiving data processing device comprising program instructions for a reconstruct routine, the reconstruct routine further comprising:
   fifth program instructions to read the computer readable memory to obtain the plurality of memory locations having each of the partitioned N data streams and the at least two attached encryption keys;
   sixth program instructions to fetch each of the N partitioned data streams and the at least two attached encryption keys from each of the plurality of memory locations across the communications network;

seventh program instructions to detach the at least two attached encryption keys form each of the plurality of memory locations and assign the detached encryption keys to its respective assigned encrypted data stream;

eighth program instructions to decipher each of the N encrypted data streams with its respective encryption key;

ninth program instructions having an inverse algorithm to read each of the N deciphered data streams and determine what fields have been removed from each of the N deciphered data streams; and tenth program instructions to reconstruct the original data from the N data streams, wherein the fifth, sixth, seventh, eighth, ninth, and tenth program instructions are stored on the second computer readable storage media for execution by the second computer processor via the second computer readable memory.

19. A service for securing data, the service comprising:

a computer processing device reading intact original data;

the computer processing device transferring the intact original data onto a secure server;

a separation routine executing in a processor copying the intact original data into a plurality of data streams;

a partition routine executing in the same or different processor, in accordance with at least one algorithm, removing different fields from each of the plurality of data streams such that no two data streams are identical;

the separation routine obtaining a plurality of cryptographic keys;

the separation routine encrypting each of the plurality of data streams with its respective unique cryptographic key;

the separation routine attaching at least two cryptographic keys to a data stream that cannot be deciphered with the attached cryptographic keys; and the same or different processing device storing each data stream with the attached at least two cryptographic keys at a different secure memory location, each different secure memory location having a different security access procedure.

20. The service of claim 19, further comprising:

a reconstruct routine executing on the same or different processing device reading a plurality of addresses pertaining to each secure memory location;

the reconstruct routine accessing at least one inverse algorithm, each inverse algorithm to insert data fields from different ones of the plurality of data streams, the data fields that had been removed by its respective algorithm;

the reconstruct routine accessing each secure memory location with its respective different security access procedure;

the reconstruct routine retrieving an encrypted data stream and the attached cryptographic keys from each of the secure memory locations onto a second secure server;

the reconstruct routine assigning each of the cryptographic keys to its respective data stream;

the reconstruct routine deciphering each of the encrypted data streams using its respective assigned cryptographic key;

the reconstruct routine reconstructing the intact original data on the second secure server; and the reconstruct routine delivering the intact original data to a customer.

* * * * *